(12) United States Patent
Douberley et al.

(10) Patent No.: US 9,736,700 B1
(45) Date of Patent: Aug. 15, 2017

(54) CELLULAR COMMUNICATION EQUIPMENT RADIO RESOURCE ADAPTATION

(71) Applicant: Sprint Communications Company L.P., Overland Park, KS (US)

(72) Inventors: David N. Douberley, Orlando, FL (US); Todd M. Szymanski, Orlando, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 102 days.

(21) Appl. No.: 14/882,075

(22) Filed: Oct. 13, 2015

(51) Int. Cl.
*H04W 4/00* (2009.01)
*H04W 24/00* (2009.01)
*H04W 16/18* (2009.01)
*H04W 16/02* (2009.01)
*H04W 16/22* (2009.01)
*H04B 7/26* (2006.01)

(52) U.S. Cl.
CPC .......... *H04W 16/18* (2013.01); *H04B 7/2628* (2013.01); *H04W 16/02* (2013.01); *H04W 16/22* (2013.01)

(58) Field of Classification Search
CPC ..... H04W 16/02; H04W 16/18; H04W 16/22; H04W 80/04; H04W 84/12; H04W 84/18; H04W 88/06; H04W 88/08; H04W 74/04; H04B 7/2628; H04B 2201/70701; H04B 7/2621; H04B 7/2643
USPC .................. 370/465–474, 328, 342–345, 370/395.5–395.54
See application file for complete search history.

(56) References Cited

U.S. PATENT DOCUMENTS

| | | | | |
|---|---|---|---|---|
| 7,330,439 | B1 * | 2/2008 | Puuskari | H04W 28/16 370/252 |
| 7,385,947 | B2 * | 6/2008 | Wu | H04W 88/08 370/328 |
| 8,041,335 | B2 * | 10/2011 | Khetawat | H04L 63/104 455/404.1 |
| 2002/0012328 | A1 * | 1/2002 | Emanuel | H04L 29/12216 370/328 |
| 2006/0014541 | A1 * | 1/2006 | Kato | H04W 16/00 455/446 |
| 2010/0234071 | A1 * | 9/2010 | Shabtay | H04B 7/0408 455/562.1 |
| 2010/0284286 | A1 * | 11/2010 | Bourdeaut | H04L 1/0026 370/252 |
| 2011/0009113 | A1 * | 1/2011 | Vikberg | H04W 12/08 455/422.1 |

(Continued)

*Primary Examiner* — Thai Hoang

(57) ABSTRACT

A cellular communication radio resource adaptor. The adaptor comprises a data store, at least one processor, a non-transitory memory, and an application. The application accesses a network management system (NMS) of an original equipment manufacturer (OEM) identified in an inventory of radio access network (RAN) equipment to read cell site equipment setting information. The application analyzes the cell site setting information and presents a map of an area overlaid with a graphical indication of the cellular communication radio resources owned or leased by a service provider and overlaid with a graphical indication of the cellular coverage areas by each cell site. The service provider may then adapt RAN equipment of the cell sites to efficiently use cellular communication radio resources.

20 Claims, 10 Drawing Sheets

(56) References Cited

U.S. PATENT DOCUMENTS

2011/0249567 A1* 10/2011 Kini ................... H04W 24/00
                                                 370/241.1

* cited by examiner

CELLULAR COMMUNICATION EQUIPMENT RADIO RESOURCE ADAPTATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The Federal Communications Commission (FCC) utilizes an auction system to sell licenses for particular bandwidth frequencies on the electromagnetic spectrum to businesses such as telecommunications service provider companies. This system generates billions of dollars of revenue for the FCC and also regulates the allocation of these finite spectrum resources. Because purchasing and obtaining the spectrum is a highly competitive and costly process, companies want to use their portion of the spectrum as effectively as possible. The technological advancements of mobile communication that uses the spectrum has evolved, which caused more demand from consumers to use the spectrum. Second generation (2G), third generation (3G), and fourth generation (4G) technologies have different requirements regarding spectrum use. A cell site on a radio access network (RAN) may comprise a plurality of network equipment items from a plurality of different vendors or original equipment manufacturers (OEMs) that use different communication techniques unique to its vendor. Each cell site has a range of how far it may provide service to a geographical area and uses a plurality of spectrum channels to transmit signals over an area.

SUMMARY

In an embodiment, a method of adapting cellular communication radio resources is disclosed. The method comprises an inventory of RAN equipment comprising a plurality of cell sites and each cell site is identified in the inventory as comprising at least three of a radio power amplifier, a radio transceiver, a baseband processor, an enhanced node B (eNB), a base transceiver station (BTS), and a remote radio head (RRH); accessing by a computer system, a network management system (NMS) of an original equipment manufacturer (OEM) that provides at least some of the cell site equipment; for each cell site identified in the inventory of the RAN equipment, reading by the computer system cell site equipment setting information from the NMS; analyzing by the computer system the cell site equipment setting information to determine radio frequency channels deployed at each cell site identified in the inventory of RAN equipment, power amplifier settings at each cell site, cellular communication technologies deployed at each cell site, and antenna settings at each cell site to determine a cellular coverage area provided by each cell site by cellular communication technology and by radio frequency channel; receiving an input by a computer system that defines a reallocation of a plurality of code division multiple access (CDMA) radio channels of a first one of the cell sites in an area to a single long term evolution (LTE) radio channel at the first one of the cell sites in the area; analyzing by the computer system a projected ripple effect on communication service by a plurality of other cell sites in the area; and present by the computer on a user interface display a map of the area overlaid with a graphical indication of cellular communication radio resources owned or leased by a service provider in the area and overlaid with a graphical indication of cellular coverage areas by each cell site within the area by cellular communication technology and by radio frequency channel based on the projected ripple effect.

In an embodiment, a method of adapting cellular communication radio resources is disclosed. The method comprises identifying an inventory of radio access network (RAN) equipment, where the RAN equipment comprises a plurality of cell sites and each cell site is identified in the inventory as comprising at least three of a radio power amplifier, a radio transceiver, a baseband processor, an enhanced node B (eNB), a base transceiver station (BTS), and a remote radio head (RRH); for each cell site identified in the inventory of RAN equipment, accessing by a computer system on a network management system (NMS) of an original equipment manufacturer (OEM) that provides at least some of the cell site equipment; for each cell site identified in the inventory of RAN equipment, reading by the computer system cell site equipment setting information from the NMS; analyzing by the computer system the cell site equipment setting information to determine radio frequency channels deployed at each cell site identified in the inventory of RAN equipment, power amplifier settings at each cell site, cellular communication technologies deployed at each cell site, and antenna settings at each cell site to determine a cellular coverage area provided by each cell site by cellular communication technology and by radio frequency channels; and presenting by the computer on a user interface display a map of an area overlaid with graphical indication of cellular communication radio resources owned or leased by a service provider in the area and overlaid with a graphical indication of cellular coverage areas by each cell site within the area by cellular communication technology and by radio frequency channel, whereby the service provider is enabled to adapt RAN equipment of the cell sites to efficiently use the cellular communication radio resources. The method further comprises determining, based on the presentation of the map overlaid with the graphical indication of cellular communication radio resources, that two neighboring cell sites are configured with misaligned radio channels in a same wireless communication protocol technology and reconfiguring radio resources of one of the two neighboring cell sites to align with the radio channels in the same wireless communication protocol technology, whereby a number of mobile call drops handing off calls between the two neighboring cell sites is reduced.

In an embodiment, a system for adapting cellular communication radio resources is disclosed. The system comprises a data store comprising a plurality of cell sites and each cell site is identified in the inventory as comprising at least three of a radio power amplifier, a radio transceiver, a baseband processor, and enhanced node B (eNB), a base transceiver station (BTS), and a remote radio head (RRH), at least one processor, a non-transitory memory, and an application stored in the non-transitory memory. Upon execution by the processor, the application for each cell site identified in the inventory of RAN equipment, accesses a network management system (NMS) of an original equipment manufacturer (OEM) that provides at least some of the cell site equipment, reads cell site equipment setting information from the NMS for each cell site identified in the inventory of RAN equipment, analyzes the cell site equipment setting information to determine radio frequency channels deployed at each cell site identified in the inventory of RAN equipment, power amplifier setting at each cell site, and antenna settings at each cell site to determine a cellular coverage area provided by each cell site by cellular communication technology and by radio frequency channel, and presents a user interface display of a map of an area overlaid with a graphical indication of cellular communication radio resources owned or leased by a service provider in the area and overlaid with a graphical indication of cellular coverage areas by each cell site within the area by cellular communication technology and by radio frequency channel.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1A:
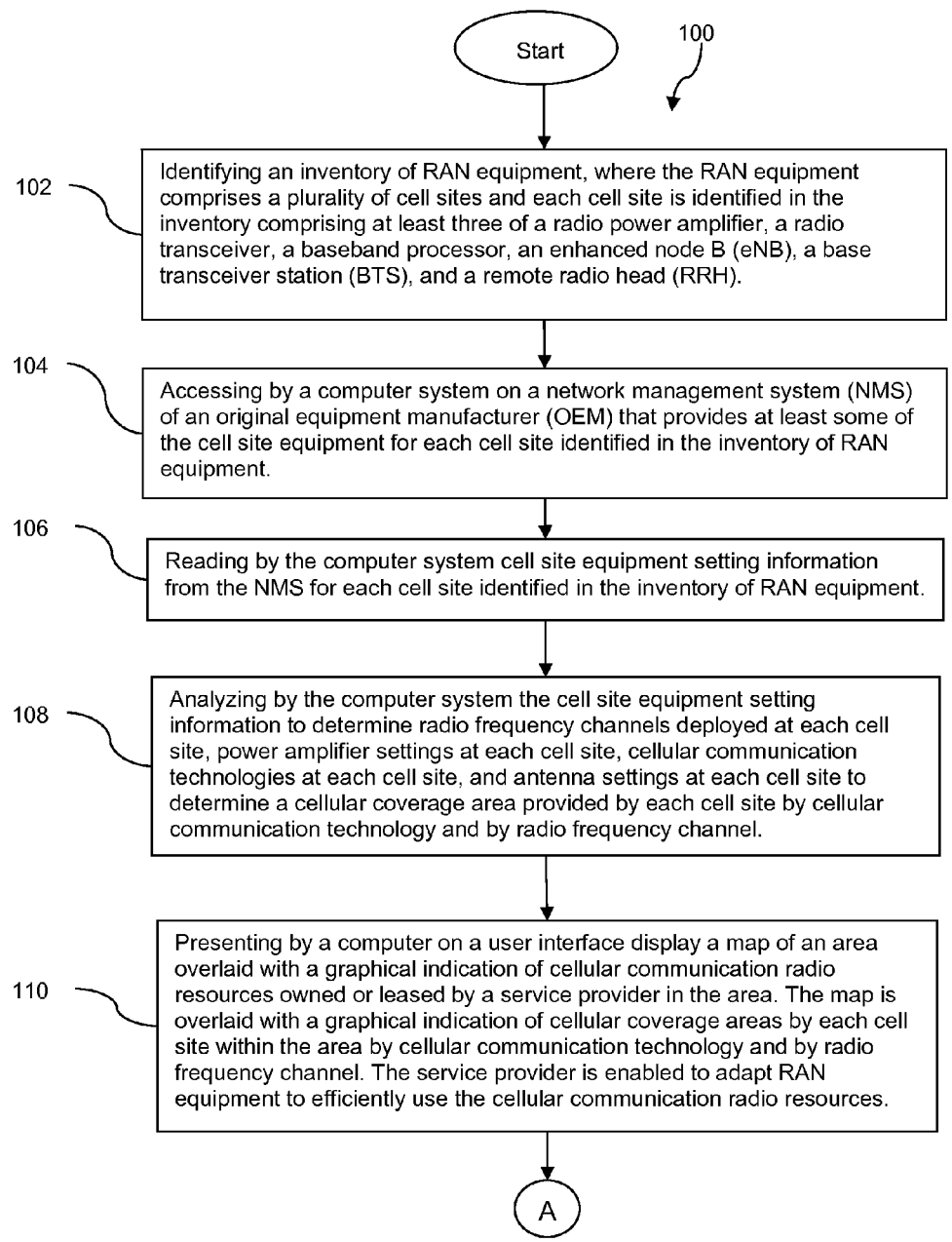
FIG. 1A and FIG. 1B is a flow chart illustrating a method according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In the past, radio communication resources (cellular radio spectrum) may have been documented manually based on business plans. To determine what radio resources were actually in service at a given cell site or region, the custom in the past may have been to consult the business plan and assume the cellular radio access network (RAN) had been built out according to the plan. In fact, however, actual network buildouts rarely follow the initial business plans and technology deployment plans exactly. Further, even when initially built to the plans, cell sites are often reconfigured after initial deployment and hence their configuration drifts from the plan documentation. It might be hoped that these changes would be documented, but this does not always happen. There are sometimes errors in cell site set-ups that result in deviations from plans. Thus it has been found in practice that relying on plan documentation to analyze the configurations and radio resources deployed in the RAN is unreliable. The alternative was for individuals using network management systems (NMSs) or element management systems (EMSs) provided by a variety of different communication equipment vendors to go into individual network equipment items and discover their "as built" configurations, as it is configured at the immediate time. This was time consuming and impracticable.

The present disclosure teaches a system and method of monitoring, analyzing, and mapping cell site equipment of a RAN by an application executed by a processor. Network equipment items in a network may be provided by various vendors and original equipment manufacturers (OEMs). Different equipment items from different vendors and OEMs may support different cellular technologies that a cell site uses such as code division multiple access (CDMA) EV-DO, CDMA 1×-RTT, and long term evolution (LTE) cellular technologies. Different cellular technologies may be deployed using different radio bandwidths for user equipment (UE) in order to communicate with cell sites. For example, CDMA EV-DO and CDMA 1×-RTT cellular technologies may be deployed by a wireless communication service provider in 1.25 MHz bandwidth channels, and LTE cellular technology may be deployed by the same provider in 5 MHz bandwidth channels (or in some other increment such as 1.4 MHz, 3 MHz, 10 MHz, 15 MHz, or 20 MHz). Bandwidths are bought or leased from the Federal Communications Commission (FCC) by service provider companies. Service provider companies want to ensure that all the bandwidths they own or lease are being efficiently and effectively used by the company. Sometimes, service providers do not utilize all available bandwidths that they have leased in an area. Also, sometimes there are cellular coverage gaps in an area which may lead to an increased dropped call rate or network disruption of a data session.

A service provider company may like to know how much spectrum is deployed at a specific cell site that it operates and how the spectrum at the cell site interacts with the spectrum deployed at its neighboring cell sites. For example, a service provider may like to see how many channels of long term evolution (LTE) are deployed in a region which uses ten cell sites to support its customers. According to the system described herein, a geographical map of the region overlaid with the LTE coverage provided by each cell site can be presented on a user interface display, for example on a workstation of a network operations center (NOC) operator, that would allow the NOC operator and/or service provider to identify areas of LTE coverage gaps. To remedy the LTE coverage gaps, a service provider may elect to change the power settings and/or antenna settings at the cell sites. From the map of radio frequency channels deployed at each cell site, a service provider may see the relationships between neighboring cell sites. The relationships may include the number of aligned and/or unaligned channels by neighboring cell sites. Unaligned channels at neighboring cell sites may compel mobile phones in motion to change channels during a handover, which causes a hard handover. Hard handovers result in more dropped calls when switching between cell sites. A service provider may also map areas of hard handoff zones on the user interface display.

A service provider may operate upwards of 50,000 cell sites across the country and may manage time-phased deployments of newly adapted technology at some of these cell sites. During such a period of new technology deployment, a service provider may have a national deployment plan that may be complex as to how the spectrum should be deployed at each of these cell sites. Various unplanned events may cause changes to the plans. These changes may or may not be reported to all levels of the service provider company. Therefore, keeping up to date with all 50,000 cell sites across the nation may be a challenging task for these companies.

At a given cell site, there may be three or four different vendor technologies deployed. For example, a service provider may want to see how many channels of each CDMA EV-DO, CDMA 1x-RTT, and/or LTE cellular technologies are deployed at a cell site. A service provider may extract the configuration files stored in the baseband processor from the network management systems (NMSs) or element management systems (EMSs) of the cell site equipment to read cell site equipment setting information. Each different vendor may provide a different NMS to maintain and operate its network equipment. They may then decide if the spectrum at each cell site is being deployed efficiently. A service provider may then elect to convert four contiguous channels of 1.25 MHz CDMA cellular technology to one channel of 5 MHz LTE cellular technology to increase LTE coverage in an area. Using cellular coverage information of the different cellular technologies, a service provider may then determine how many customers in a geographical region may be supported by the cell sites. If the population was to increase to surpass this limit or if a larger coverage area was required, the settings of the radio power amplifier and tilt of the antenna may be altered or an additional cell site may be implemented to modify the coverage area and to support the customers.

In a geographical area, the system disclosed herein collects data from NMSs at a cell tower on a daily basis. The data includes physical characteristics as well as technological characteristics of a plurality of cell sites in that area. Physical characteristics may comprise radio power amplifier settings and antenna settings. Technological characteristics may comprise the cellular technologies and the spectrum deployed at each cell site. A service provider may report an increased number of dropped calls in the area for a time period such as one week. Then, a network operator may elect to view a geographical map of the area displaying the locations of the cell sites. A plurality of filters may be overlaid on this map such as different filters for different cellular technologies showing the coverage area based on the data collected from the NMS. With these filters, a network operator may see the gaps in coverage and decide to adjust physical and technological settings at a cell site accordingly such as altering the angle of tilt of the antenna to cover a larger distance from a cell site. The changes made may be stored in a database that allows other workers to see the current state of the cell site.

The system and methods taught herein overcome many of the problems described above with relying on business plans and manual documentation. Further, the system enables a real-time response with early feedback on actions taken to realign or reconfigure the RAN. The system enables integrating coverage maps with activity and trouble reports from neighboring cell towers and neighboring regions. The system provides an opportunity to discern an increase in communication troubles, explore radio coverage issues that may be responsible for the increased trouble, instruct or indicate potential remedial actions to take in the RAN, and confirm that the actions were performed. When such changes or actions are made, the system can provide timely and comprehensive feedback on the results engendered by the actions. The practical advantages provided by the system can be applied to monitoring and evaluating the progress of the rollout of a new technology. It is understood that when a major wireless communication service provider decides to deploy a new technology, the deployment takes place over an extended period of time: 40,000 or more cell sites cannot be updated over a single weekend or over a single month.

Figure 1B:
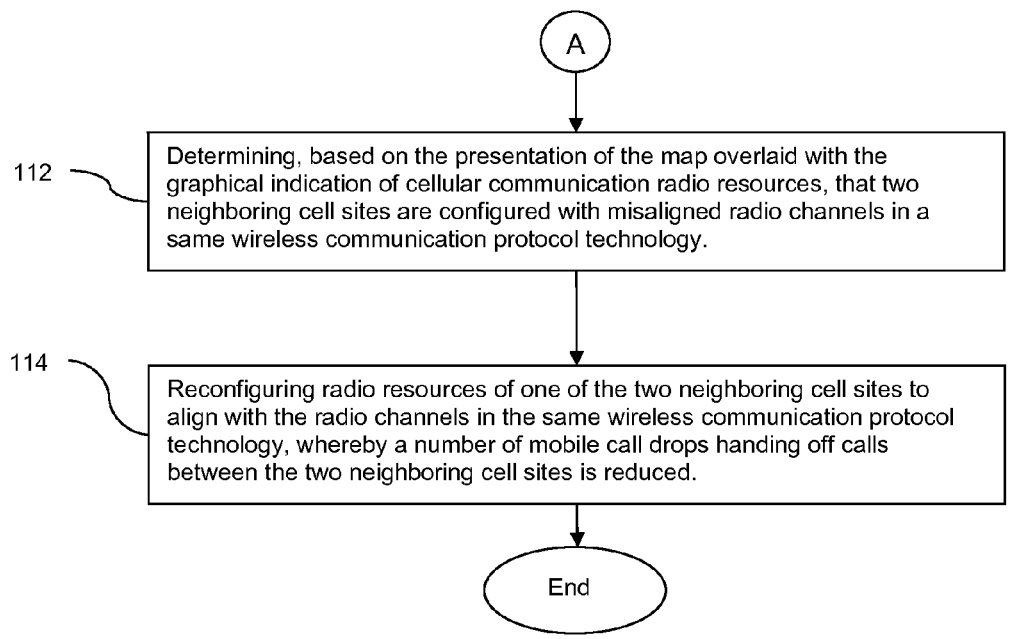

Turning now to FIG. 1A and FIG. 1B, a method 100 is described. At block 102, an inventory of radio access network (RAN) equipment is identified. The RAN equipment comprises a plurality of cell sites, and each cell site identified in the inventory comprises at least three of a radio power amplifier, a radio transceiver, a baseband processor, an enhanced node B (eNB), a base transceiver station (BTS), and a remote radio head (RRH). The RAN equipment may also comprise small cells that may comprise a plurality of like functional equipment within a single device or package and such small cells may also be included in the inventory of RAN equipment. At block 104, a computer system accesses on a network management system (NMS) of an original equipment manufacturer (OEM) that provides at least some of the cell site equipment for each cell site identified in the inventory of RAN equipment. At a cell site, there may be more than one vendor or OEM that provides the RAN equipment. The NMS of each OEM gathers information of its corresponding network element. At block 106, the computer system reads cell site equipment setting information from the network management system for each cell site identified in the inventory of RAN equipment. The computer system reads the cell site equipment setting information from the NMS periodically. For example, this period may be a day.

After collecting the cell site equipment setting information, at block 108, the computer system analyzes the cell site equipment setting information to determine radio frequency channels deployed at each cell site, power amplifier settings deployed at each cell site, cellular communication technologies at each cell site, and antenna setting at each cell site to determine a cellular coverage area provided by each cell site by cellular communication technology and by radio frequency channel. A cell site may comprise any combination of an LTE wireless technology, a CDMA EV-DO wireless technology, and a CDMA 1x-RTT wireless technology.

At block 110, a user interface display of a computer presents a map of an area overlaid with a graphical indication of cellular communication radio resources owned or leased by a service provider in the area. The map may also be overlaid with a graphical indication of cellular coverage areas by each cell site within the area by cellular communication technology and by radio frequency channel. The service provider is enabled to adapt RAN equipment to efficiently use the cellular communication radio resources. For example, if a cell site contains four contiguous channels of 1.25 MHz frequency CDMA EV-DO wireless technology, and the cell site also comprises network elements that support LTE wireless technology, the service provider may elect to change the four contiguous 1.25 MHz frequency CDMA EV-DO wireless technology channels to a single 5

MHz frequency LTE wireless technology channel. Other changes that may be made to a cell tower is to remotely adjust the angle of the antenna settings and to raise or lower the power amplifier settings. These changes made to the cell site may be recorded and stored in a history database for future reference.

Turning to FIG. 1B, and continuing method 100, at block 112, based on the presentation of the map overlaid with the graphical indication of cellular communication radio resources, may be determined (e.g., by a support person or by a radio frequency engineer) that two neighboring cell sites are configured with misaligned radio channels in a same wireless communication protocol technology. This situation can often result in a high rate of mobile call drops, as UEs move between the coverage area of a first neighboring cell site to the coverage area of the second neighboring cell site. At block 114, radio resources of one of the two neighboring cell sites are reconfigured to align with the radio channels in the same wireless communication protocol technology, whereby a number of mobile call drops handing off calls between the two neighboring cell sites is reduced.

Figure 2:
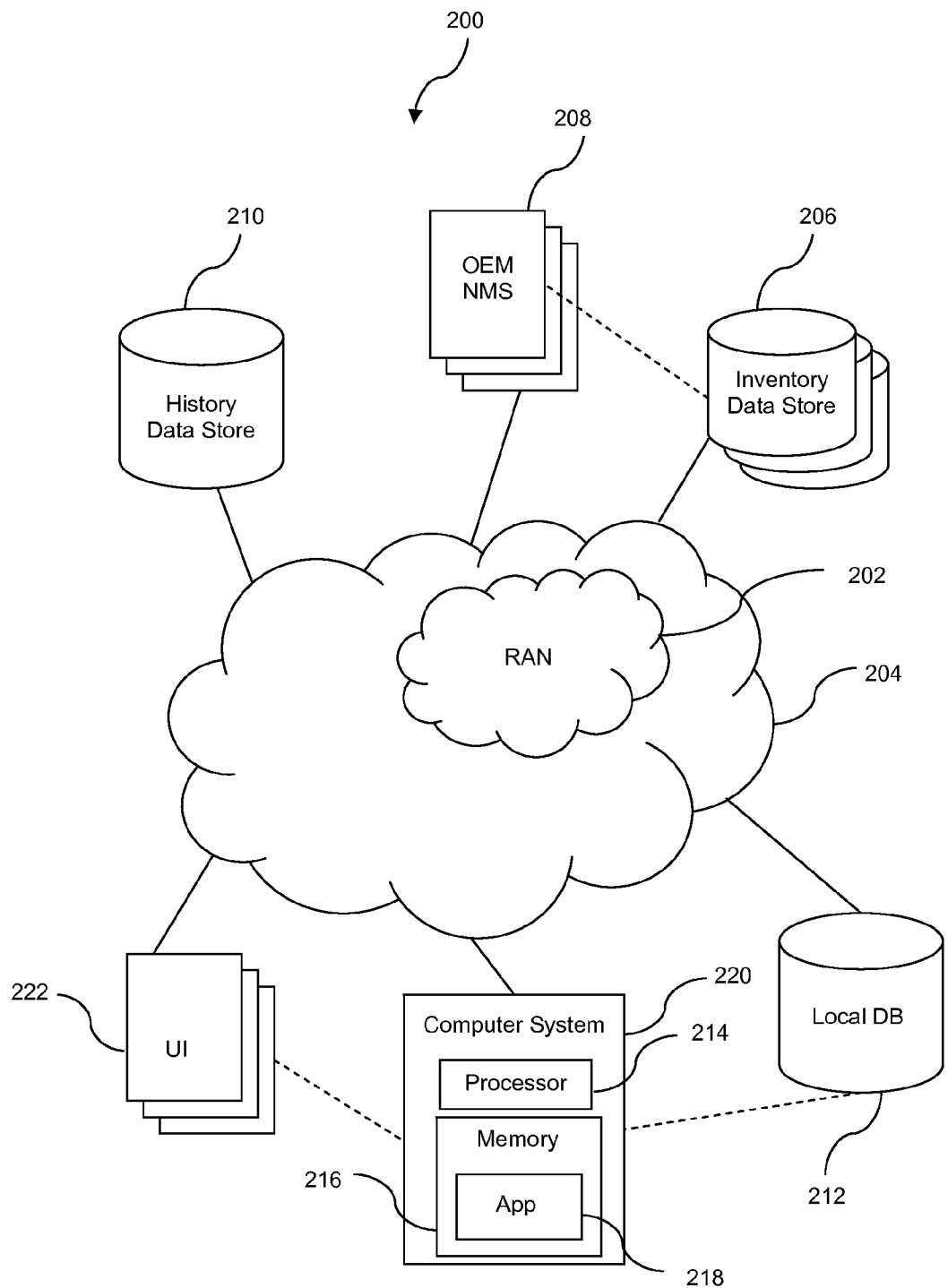
FIG. 2 is an illustration of a system for adapting cellular communication radio resources according to an embodiment of the disclosure.

Turning now to FIG. 2, a cellular communication radio resource adapter system 200 is shown. The system 200 comprises a radio access network (RAN) 202 in a network 204. An inventory data store 206, a plurality of network managements systems (NMSs) of an original equipment manufacturers (OEMs) 208, a history data store 210, a local data store 212, a computer system 220, and a plurality of user interfaces 222, are communicatively linked to the network 204. The computer system 220 comprises a processor 214 and a non-transitory memory 216. An application 218 is stored in the non-transitory memory 216.

Upon execution by the processor 214, the application 218 accesses a network management system 208. The network management system 208 accesses cell site equipment setting information of the inventory data store 206 through the network 204, where, in an embodiment, each cell site uses cell site equipment from at least two different vendors or original equipment manufacturers (OEMs). The cell site equipment setting information may come from configuration files of the network management systems 208 unique to each vendor. These files may be formatted using a plurality of languages such as extensible markup language (XML) format, comma separated value (CSV) format, or any other format. The inventory data store 206 comprises radio access network (RAN) equipment, which is further discussed hereinafter in FIG. 3. The application 218 may collect cell site equipment information from the inventory data store 206 on a daily basis and store the setting information in a local database 212. The application 218 analyzes the cell site equipment setting information from the local database 212. This information may be power amplifier and antenna settings at each cell site, frequency channels deployed at each cell site, and/or cellular technologies deployed at each cell site. The application 218 may also analyze the maximum number of customers that may be serviced by a single cell site. For example, one 5 MHz frequency channel may provide service to one hundred customers, five hundred customers, one thousand customers, or any number of customers.

The application 218 presents on a display of a user interface 222 a geographical map of an area overlaid with a graphical presentation of the cellular resources owned or leased by the service provider in the area. The map may also be overlaid with the cellular coverage areas by each cell site within the area. For example, a cell site normally contains three sectors, where each sector transmits its own signal. The map may contain the coverage areas of a cell site and its neighboring cell sites in the area, wherein the neighboring cell sites are the five geographically closest cell sites. For example, the map may indicate gaps in LTE cellular coverage. A service provider company may adapt some of the cell site equipment to minimize or eliminate the gaps in LTE coverage. The changes may include raising power amplifier settings and/or adjusting the angle of tilt of the antenna. These changes may be stored in the history data store 210 for future reference. The map may also display on the user interface 222 the different cellular technologies deployed at a cell site such as CDMA EV-DO, CDMA IX-RTT, and LTE cellular technologies. The radio frequency channels deployed at each cell site may be either aligned and/or unaligned with its neighboring cell sites. Aligned channels result in soft handoffs of an ongoing call or data session, and unaligned channels may result in hard handoffs of an ongoing call or data session. Hard handoffs are less reliable than soft handoffs, and hard handoffs result to a higher call drop rate, which would decrease customer satisfaction of a service provider company.

Figure 3:
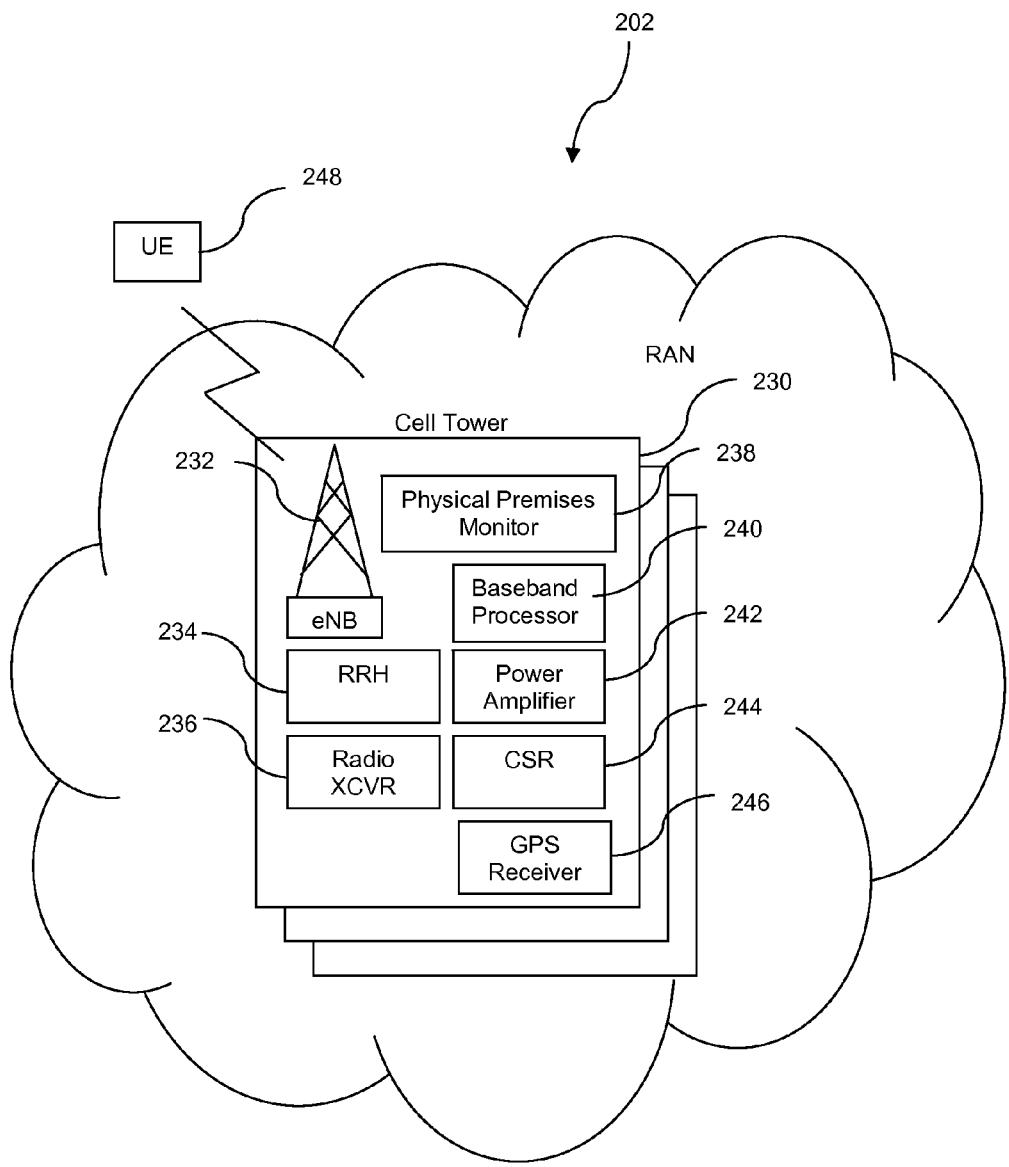
FIG. 3 is an illustration of a cell tower according to an embodiment of the disclosure.

Turning now to FIG. 3, the radio access network (RAN) 202 is described. The RAN 202 comprises a plurality of cell towers 230. The plurality of cell towers 230 may comprise more than 50,000 cell towers belonging to a service provider. The cell tower 230 may further comprise an enhanced node B (eNB) 232, a radio receiver head (RRH) 234, a radio transceiver 236, a physical premises monitor 238, a baseband processor 240, a power amplifier 242, a cell site router 244, and a GPS receiver 246. A user equipment (UE) 248 may be communicatively coupled with the radio access network 202 through a cell tower 230. The UEs 248 may be mobile telecommunications devices, smart phones, personal digital assistants (PDAs), media players, wearable computers, headset computers, laptop computers, tablet computers, notebook computers, or desktop computers. The UE 248 may establish a communication link with the radio transceiver 236 and/or the eNB 232 according to a long term evolution (LTE), a code division multiple access (CDMA) 1×RTT, a code division multiple access (CDMA) EV-DO, a worldwide interface for microwave access (WiMAX), or another wireless telecommunication protocol. In some contexts, the eNB 206 may be referred to as a base transceiver station (BTS).

The cell tower 230 may support different cellular technologies such as second generation (2G), third generation (3G), and fourth generation (4G) cellular technologies depending on the network elements it contains. While only one of an enhanced node B (eNB) 232, a radio receiver head (RRH) 234, a radio transceiver 236, a physical premises monitor 238, a baseband processor 240, a power amplifier 242, and a cell site router 244 is depicted in FIG. 3, it is understood that a cell tower 230 may comprise any number and combination of an enhanced node B (eNB) 232, a radio receiver head (RRH) 234, a radio transceiver 236, a physical premises monitor 238, a baseband processor 240, a power amplifier 242, and a cell site router 244. The GPS receiver 246 provides the location of the cell tower 230 so the application 218 may locate the cell tower's geographical location in order to map on the display of the user interface 222.

Figure 4:
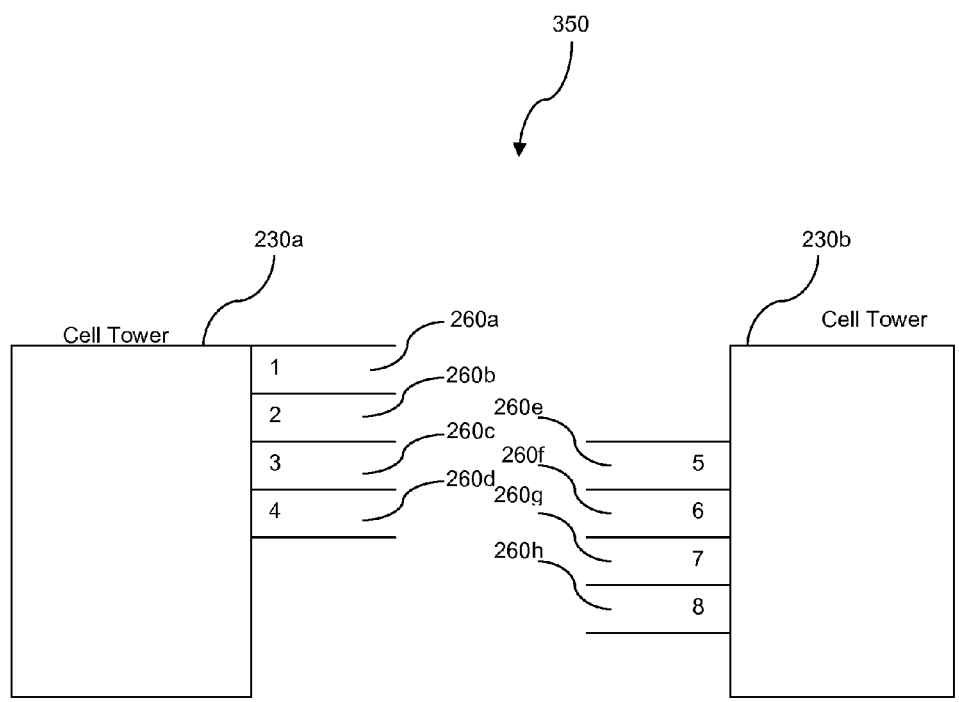
FIG. 4 is an illustration of neighboring cell towers according to an embodiment of the disclosure.
Figure 5:
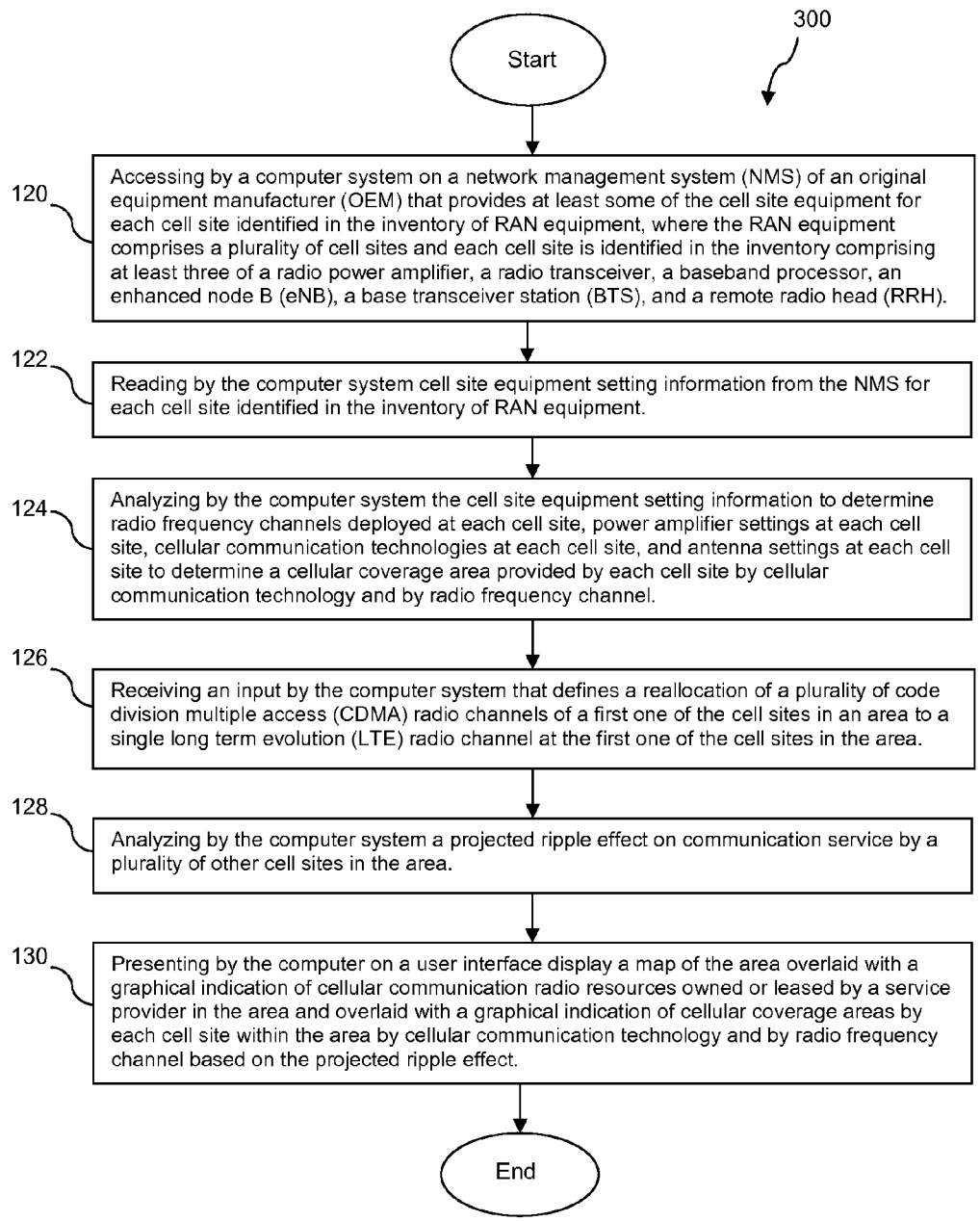
FIG. 5 is a flow chart illustration a method according to an embodiment of the disclosure.

Turning now to FIG. 4, an abstract view of neighboring cell towers 350 is illustrated. The neighboring cell towers 350 comprise cell tower 230a and cell tower 230b. Each cell tower 230 propagates its own radio frequency channels 260 depending on what radio frequency channels 260 the service provider owns or leases in the area. Cell tower 230a comprises four channels: channel 1 260*a*, channel 2 260*b*, channel 3 260*c*, and channel 4 260*d*. Cell tower 230*b* also comprises four channels: channel 5 260*e*, channel 6 260*f*, channel 7 260*g*, and channel 8 260*h*. While only two cell towers 230 are illustrated in FIG. 5, it is understood that any number of cell towers 230 may neighbor a cell tower. For example, neighboring cell towers may include the nearest three cell towers, five cell towers, eight cell towers, or any number of adjacent cell towers. While only four radio frequency channels 260 are illustrated per cell tower 230, it is understood that a single cell tower 230 may propagate any number of radio frequency channels 260 such as five radio frequency channels, ten radio frequency channels, twenty radio frequency channels, or any number of radio frequency channels allocated to that cell tower 230.

A cell tower 230 may use network equipment items from a plurality of vendors and original equipment manufacturers (OEMs). This equipment may support different technologies in cellular communication such as second generation (2G), third generation (3G), and fourth generation (4G) cellular communication technologies. A cell tower 230 may support more than one cellular communication technology such as code division multiple access (CDMA) EV-DO technology, CDMA 1×-RTT technology, and/or long term evolution (LTE) technology. For example, if radio frequency channels 260*a*-260*d* were all 1.25 MHz bandwidth, channel 1 260*a*, channel 2 260*b*, and channel 3 260*c* of cell tower 230*a* may support CDMA EV-DO cellular technology, and channel 4 260*d* of cell tower 230*a* may support CDMA 1×-RTT technology. In another example, if radio frequency channels 1-4 260*a*-260*d* of cell tower 230*a* were again 1.25 MHz bandwidth, channels 1-4 260*a*-260*d* may be combined to form a single 5 MHz bandwidth of LTE cellular technology given that cell tower 230*a* comprises network equipment items to support LTE cellular technology.

Neighboring cell towers 350 may have radio frequency channels 260 that are aligned. As illustrated in FIG. 4, cell tower 230*a* and cell tower 230*b* have two aligned channels 260. Channel 3 260*c* and channel 5 260*e* are aligned channels, and channel 4 260*d* and channel 6 260*f* are aligned channels. Aligned channels share the same radio frequency, so both cell towers 230 propagate a same radio frequency. Channel 260*a* and channel 260*b* of cell tower 230*a* and channel 7 260*g* and channel 260*h* of cell tower 230*b* are unaligned channels since they do not share a same radio frequency channel with the neighboring cell tower. Neighboring cell towers may comprise all aligned channels or all unaligned channels or any combination of aligned and unaligned channels.

For example, as a user equipment (UE) engaged in an ongoing call or data session moves away from one cell tower 230*a* to a neighboring cell tower 230*b*, such as when the user is in a car driving from cell tower 230*a* to cell tower 230*b*, the cell tower 230*a* will handoff the ongoing call or data session to cell tower 230*b*. Handing off on aligned channels would result in a soft handoff, where a cellular connection is simultaneously connected to both cell towers 230*a* and 230*b* before disconnecting from cell tower 230*a*. Handing off on unaligned channels would result in a hard handoff, where a cellular connection is released by a cell tower 230*a* before a cell tower 230*b* engages the connection in a channel 260. In a hard handoff, the cellular connection may be broken before or during the connection to the next cell tower 230, which more likely causes a dropped call or data session interruption.

Turning now to FIG. 5, a method 300 is described. At block 120, an inventory of RAN equipment is identified. A computer system accesses a network management system (NMS) of an original equipment manufacturer (OEM) that provides at least some of the cell site equipment for each cell site identified in the inventory of RAN equipment. The RAN equipment comprises a plurality of cell sites and each cell site identified in the inventory comprises at least three of a radio power amplifier, a radio transceiver, a baseband processor, an enhanced node B (eNB), a base transceiver station (BTS), and a remote radio head (RRH). At block 122, the computer system reads cell site equipment setting information from the NMS for each cell site identified in the inventory of RAN equipment. At block 124, the computer system analyzes the cell site equipment setting information to determine radio frequency channels deployed at each cell site, power amplifier setting at each cell site, cellular communication technologies at each cell site, and antenna settings at each cell site to determine a cellular coverage area provided by each cell site by cellular communication technology and by radio frequency channel.

At block 126, the computer system receives an input that defines a reallocation of a plurality of code division multiple access (CDMA) radio channels of a first one of the cell sites in an area to a single long term evolution (LTE) radio channel as the first one of the cell sites in the area. At block 128, the computer system analyzes a projected ripple effect of the reallocation on communication service by a plurality of other cell sites in the area. For example, the projected ripple effect may comprise a dropped call rate increase for at least one of the other cell sites in the area resulting from the reallocation of radio channels of the first cell site in the area. In another example, the projected ripple effect may comprise projection of a changed wireless call handling volume for at least one of the other cell sites in the area resulting from the reallocation of radio channel of the first cell site in the area.

At block 130, the computer presents on a user interface display a map of the area overlaid with a graphical indication of cellular communication radio resources owned or leased by a service provider in the area. Also overlaid is a graphical indication of cellular coverage areas by each cell site within the area by cellular communication technology and by radio frequency channel based on the projected ripple effect. The graphical indication may also display hard handoff zones on the user interface display. Hard handoff zones occur when neighboring cell sites do not share radio frequency channels.

Figure 6:
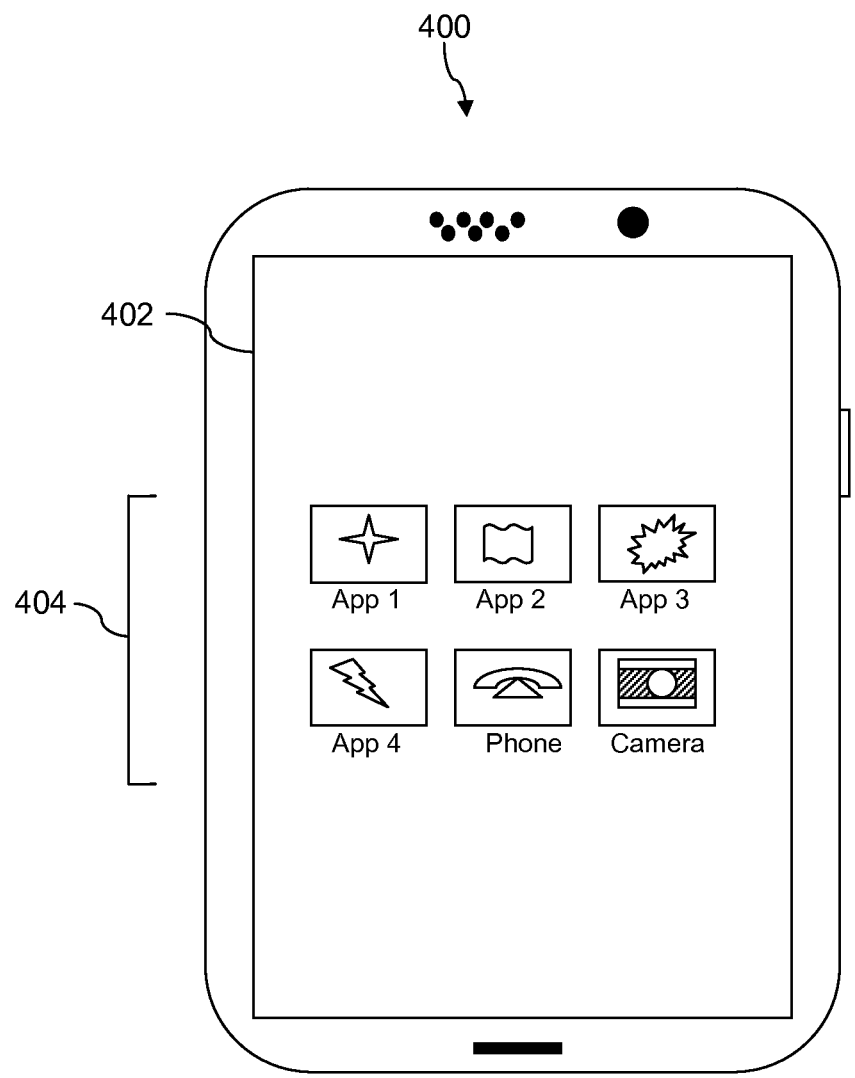
FIG. 6 is an illustration of a user equipment (UE) according to an embodiment of the disclosure.

FIG. 6 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/ or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 7:
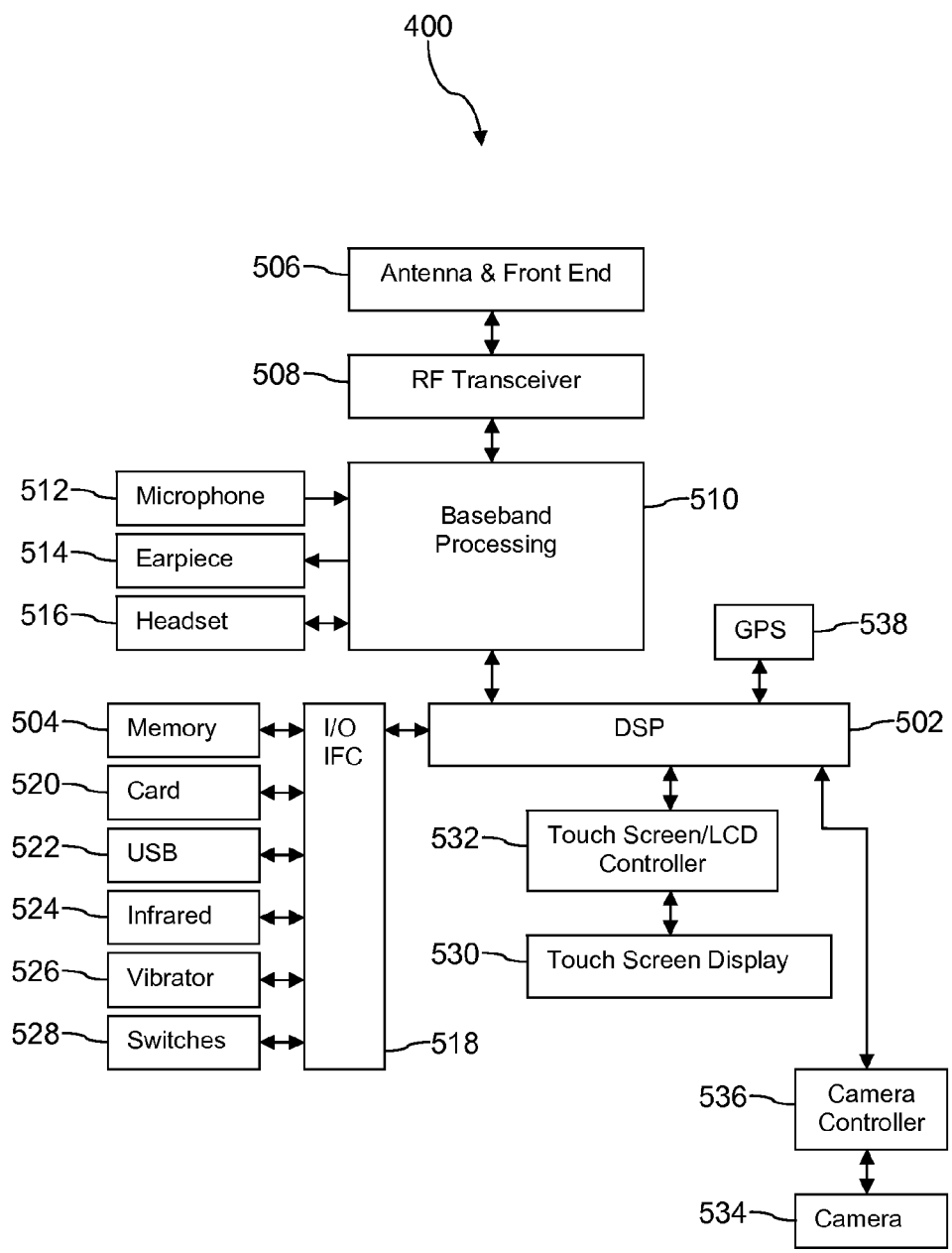
FIG. 7 is a block diagram of a user equipment (UE) according to an embodiment of the disclosure.

FIG. 7 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 8A:
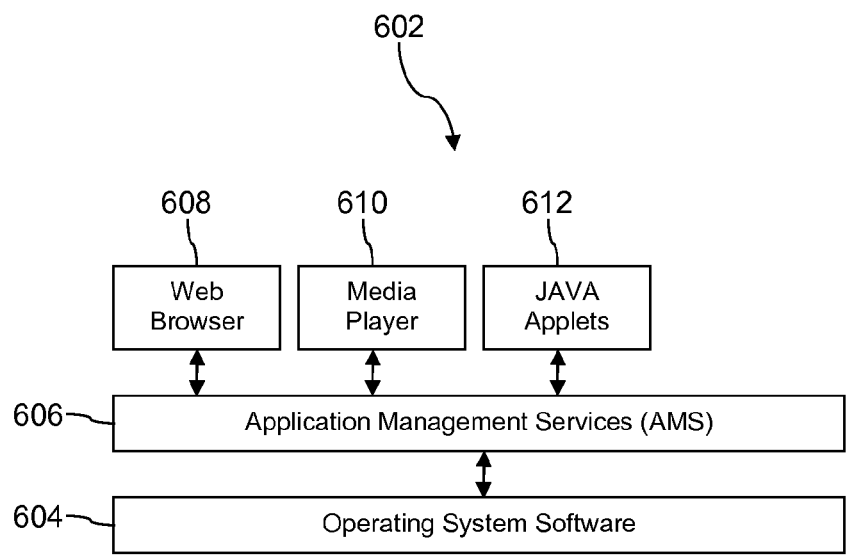
FIG. 8A is a block diagram of a software architecture of a user equipment (UE) according to an embodiment of the disclosure.

FIG. 8A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 8A are a media player application 610 and JAVA applets 612. The media player application 610 may be executed by the UE 400 to play audio or audiovisual media. The JAVA applets 612 may be executed by the UE 400 to provide a variety of functionality including games, utilities, and other functionality.

Figure 8B:
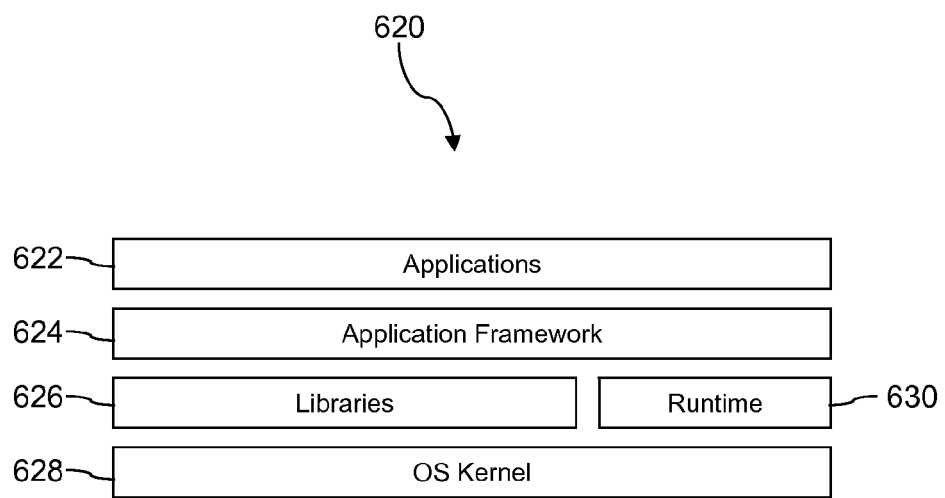
FIG. 8B is a block diagram of another software architecture of a computer system according to an embodiment of the disclosure.

FIG. 8B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 9:
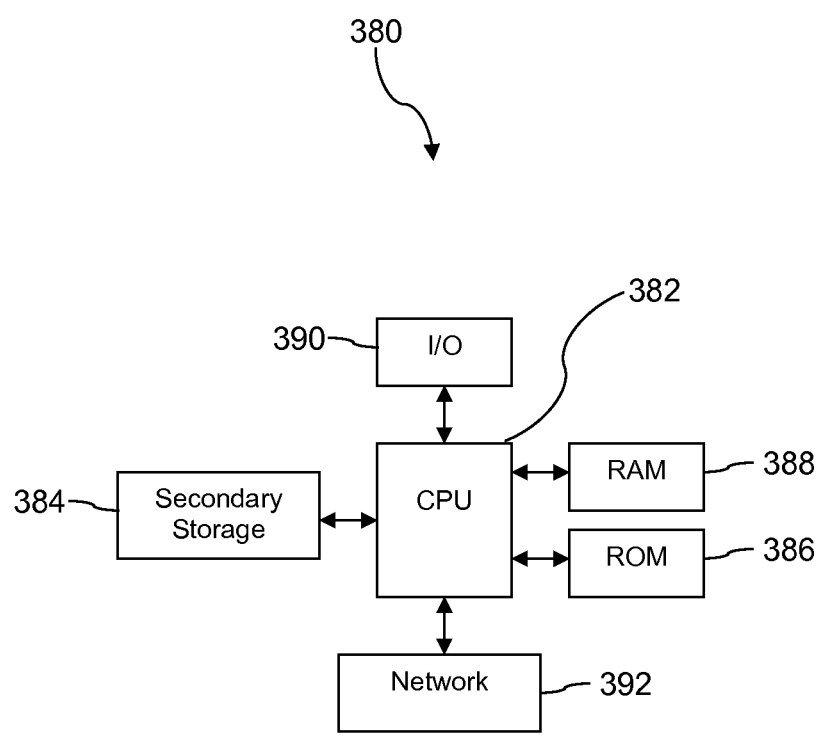
FIG. 9 illustrates an exemplary computer system suitable for implementing the several embodiments of the disclosure.

FIG. 9 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of adapting cellular communication radio resources, comprising:

for each cell site identified in an inventory of RAN equipment, where the RAN equipment comprises a plurality of cell sites and each cell site is identified in the inventory as comprising at least three of a radio power amplifier, a radio transceiver, a baseband processor, an enhanced node B (eNB), a base transceiver station (BTS), and a remote radio head (RRH), accessing by a computer system a network management system (NMS) of an original equipment manufacturer (OEM) that provides at least some of the cell site equipment;

for each cell site identified in the inventory of RAN equipment, reading by the computer system cell site equipment setting information from the NMS;

analyzing by the computer system the cell site equipment setting information to determine radio frequency channels deployed at each cell site identified in the inventory of RAN equipment, power amplifier settings at each cell site, cellular communication technologies deployed at each cell site, and antenna settings at each cell site to determine a cellular coverage area provided by each cell site by cellular communication technology and by radio frequency channel;

receiving an input by the computer system that defines a reallocation of a plurality of code division multiple access (CDMA) radio channels of a first one of the cell sites in an area to a single long term evolution (LTE) radio channel at the first one of the cell sites in the area;

analyzing by the computer system a projected ripple effect on communication service by a plurality of other cell sites in the area; and presenting by the computer on a user interface display a map of the area overlaid with a graphical indication of cellular communication radio resources owned or leased by a service provider in the area and overlaid with a graphical indication of cellular coverage areas by each cell site within the area by cellular communication technology and by radio frequency channel based on the projected ripple effect.

2. The method of claim 1, wherein the projected ripple effect comprises projection of a dropped call rate increase for at least one of the other cell sites in the area resulting from the reallocation of radio channels of the first cell site in the area.

3. The method of claim 1, wherein the projected ripple effect comprises projection of a changed wireless call handling volume for at least one of the other cell sites in the area resulting from the reallocation of radio channels of the first cell site in the area.

4. The method of claim 1, where transferring calls from one cell site to another cell site comprises a soft handoff or a hard handoff.

5. The method of claim 1, wherein the map of the area displayed on the user interface display comprises mapping hard handoff zones.

6. The method of claim 5, wherein a hard handoff occurs when neighboring cell sites do not share channels.

7. A method of adapting cellular communication radio resources, comprising:
- identifying an inventory of radio access network (RAN) equipment, where the RAN equipment comprises a plurality of cell sites and each cell site is identified in the inventory as comprising at least three of a radio power amplifier, a radio transceiver, a baseband processor, an enhanced node B (eNB), a base transceiver station (BTS), and a remote radio head (RRH);
- for each cell site identified in the inventory of RAN equipment, accessing by a computer system a network management system (NMS) of an original equipment manufacturer (OEM) that provides at least some of the cell site equipment;
- for each cell site identified in the inventory of RAN equipment, reading by the computer system cell site equipment setting information from the NMS;
- analyzing by the computer system the cell site equipment setting information to determine radio frequency channels deployed at each cell site identified in the inventory of RAN equipment, power amplifier settings at each cell site, cellular communication technologies deployed at each cell site, and antenna settings at each cell site to determine a cellular coverage area provided by each cell site by cellular communication technology and by radio frequency channel;
- presenting by the computer on a user interface display a map of an area overlaid with a graphical indication of cellular communication radio resources owned or leased by a service provider in the area and overlaid with a graphical indication of cellular coverage areas by each cell site within the area by cellular communication technology and by radio frequency channel, whereby the service provider is enabled to adapt RAN equipment of the cell sites to efficiently use the cellular communication radio resources;
- determining, based on the presentation of the map overlaid with the graphical indication of cellular communication radio resources, that two neighboring cell sites are configured with misaligned radio channels in a same wireless communication protocol technology; and
- reconfiguring radio resources of one of the two neighboring cell sites to align with the radio channels in the same wireless communication protocol technology, whereby a number of mobile call drops handing off calls between the two neighboring cell sites is reduced.

8. The method of claim 7, where a plurality of the cell sites comprise two or more of a LTE wireless technology, a CDMA EV-DO wireless technology, and a CDMA 1x-RTT wireless technology.

9. The method of claim 7, where the computer system accesses NMSs of at least two different OEMs.

10. The method of claim 7, further comprising converting four channels of CDMA wireless technology of one of the cell sites wireless technology to one channel of LTE wireless technology based on the map displayed on the user interface, whereby the service provider promotes adapting its cellular communication resources to a later generation wireless communication protocol.

11. The method of claim 7, wherein reading the cell site equipment setting information from the NMS is performed on a daily period by the computer system.

12. The method of claim 7, wherein the power amplifier settings and antenna settings at each cell site can be remotely adjusted.

13. The method of claim 12, wherein the changes made to the cell site equipment setting information are recorded and stored in a history data store.

14. A system for adapting cellular communication radio resources, comprising:
- a data store comprising an inventory of radio access network (RAN) equipment, where the RAN equipment comprises a plurality of cell sites and each cell site is identified in the inventory as comprising at least three of a radio power amplifier, a radio transceiver, a baseband processor, an enhanced node B (eNB), a base transceiver station (BTS), and a remote radio head (RRH);
- at least one processor;
- a non-transitory memory; and
- an application stored in the non-transitory memory that, when executed by the processor
  - for each cell site identified in the inventory of RAN equipment, accesses a network management system (NMS) of an original equipment manufacturer (OEM) that provides at least some of the cell site equipment;
  - for each cell site identified in the inventory of RAN equipment, reads cell site equipment setting information from the NMS;
  - analyzes the cell site equipment setting information to determine radio frequency channels deployed at each cell site identified in the inventory of RAN equipment, power amplifier settings at each cell site, cellular communication technologies deployed at each cell site, and antenna settings at each cell site to determine a cellular coverage area provided by each cell site by cellular communication technology and by radio frequency channel; and
  - presents a user interface display of a map of an area overlaid with a graphical indication of cellular communication radio resources owned or leased by a service provider in the area and overlaid with a graphical indication of cellular coverage areas by each cell site within the area by cellular communication technology and by radio frequency channel, whereby the service provider is enabled to adapt RAN equipment of the cell sites to efficiently use the cellular communication radio resources.

15. The system of claim 14, wherein the cell site equipment setting information comprises configuration files unique to each cell site element.

16. The system of claim 14, wherein the radio channels of neighboring cell sites may be aligned or unaligned.

17. The system of claim 16, wherein the neighboring cell sites are the five closest cell sites.

18. The system of claim 14, wherein analyzing the cell site equipment setting information by the application comprises determining a maximum number of customers in a geographical area that may be serviced.

19. The system of claim 18, wherein a service provider company may set a threshold of the maximum number of customers that may be supported in an area, and when this threshold is reached, an alarm is activated to the service provider company.

20. The system of claim 19, wherein an alarm is activated, the service provider company adjusts the cell site equipment settings to accommodate the extra customers such as raising the power of the power amplifier and/or increasing the angle of tilt of the antenna.

* * * * *